US 9,941,794 B2

(12) United States Patent
Knobloch

(10) Patent No.: US 9,941,794 B2
(45) Date of Patent: Apr. 10, 2018

(54) METHOD FOR REDUCING SPURIOUS EMISSIONS FROM A VOLTAGE CONVERTER WITH CLOCKED POWER SWITCHES

(71) Applicant: SMA Solar Technology AG, Niestetal (DE)

(72) Inventor: Andreas Knobloch, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 15/281,474

(22) Filed: Sep. 30, 2016

(65) Prior Publication Data

US 2017/0019027 A1     Jan. 19, 2017

Related U.S. Application Data

(63) Continuation of application No. PCT/EP2015/056448, filed on Mar. 25, 2015.

(30) Foreign Application Priority Data

Apr. 3, 2014   (DE) .................. 10 2014 104 730

(51) Int. Cl.
*H02M 1/14*     (2006.01)
*H02M 3/158*    (2006.01)
(Continued)

(52) U.S. Cl.
CPC ............ *H02M 3/158* (2013.01); *H02J 3/383* (2013.01); *H02M 1/44* (2013.01); *H02M 3/07* (2013.01);
(Continued)

(58) Field of Classification Search
CPC ............... H02M 7/5395; H02M 7/527; H02M 2001/0038; H02M 3/158; H02M 1/44;
(Continued)

(56) References Cited

U.S. PATENT DOCUMENTS 5,510,698 A    4/1996 Stankovic et al.
7,589,432 B2   9/2009 Kawasaki et al.
(Continued)

FOREIGN PATENT DOCUMENTS

AU    199875100 B2    7/1998

OTHER PUBLICATIONS

International Search Report dated Jun. 4, 2015 PCT/EP/2015/056448.
(Continued)

*Primary Examiner* — Alex Torres-Rivera
(74) *Attorney, Agent, or Firm* — Eschweiler & Potashnik, LLC

(57) ABSTRACT

In order to reduce spurious emissions of a current converter or voltage converter having at least one power switch which is actuated with an actuating signal, wherein each actuating signal comprises switch-on pulses spaced apart from one another, and wherein pulse widths of the switch-on pulses are modulated in order to meet a specification for a current or a voltage in or at the current converter or voltage converter, the pulse widths are additionally varied more quickly and more strongly than is appropriate for meeting the specification in order to change the spectrum of the spurious emissions. In this context, changes to the pulse widths when they additionally vary compared to the pulse widths that would result only owing to their modulation to meet the specification are made on the basis of successive groups of changes which each extend over a predefined number of successive switch-on pulses and in which a sum of the changes is zero in each case. The successive groups of changes are varied with respect to at least one aspect which is selected from absolute values of the changes, signs of the changes, a sequence of the changes and an extent of the group.

12 Claims, 6 Drawing Sheets

(51) Int. Cl.
  *H02M 1/44* (2007.01)
  *H02J 3/38* (2006.01)
  *H02M 3/07* (2006.01)

(52) U.S. Cl.
  CPC .... *H02M 2003/1586* (2013.01); *Y02E 10/563* (2013.01)

(58) Field of Classification Search
  CPC .. H02M 2003/1586; H02M 3/07; H02J 3/383; Y02E 10/563
  USPC ............... 363/21.1, 21.11, 21.18, 26, 41
  See application file for complete search history.

(56) References Cited

U.S. PATENT DOCUMENTS

| | | | | |
|---|---|---|---|---|
| 9,680,375 | B2* | 6/2017 | Yu | H02M 3/156 |
| 2011/0019453 | A1 | 1/2011 | Gonzalez Senosiain et al. | |
| 2011/0095740 | A1* | 4/2011 | Mori | H02M 1/44 |
| | | | | 323/282 |
| 2012/0212197 | A1* | 8/2012 | Fayed | H02M 3/158 |
| | | | | 323/271 |
| 2014/0091774 | A1* | 4/2014 | Srinivasan | G05F 1/468 |
| | | | | 323/271 |
| 2015/0232029 | A1* | 8/2015 | Grandy | H02M 1/44 |
| | | | | 323/283 |
| 2015/0244269 | A1* | 8/2015 | Yu | H02M 3/156 |
| | | | | 323/284 |

OTHER PUBLICATIONS

Mihalic et al, "Reduced Conductive EMI in Switched-Mode DC-DC Power Converters Without EMI Filters: PWM Versus Randomized PWM" IEEE Transactions on Power Electronics, vol. 21, No. 6, Nov. 2006.

Stankovic et al, "Randomized Modulation of Power Converters via Markov Chains" IEEE Transactions on Control Systems Technology, vol. 5, No. 1, Jan. 1997.

Wang et al, "Random and Programmed Pulse-Width Modulation Techniques for DC-DC Converters" Department of Electrical Engineering and Computer Sciences University of California, Berkeley 1980.

Mori et al, "EMI Reduction by Spread-Spectrum Clocking in Digitally-Controlled DC-DC Converters" IEICE Trans. Fundamentals, vol. E92-A, No. 4 Apr. 2009.

* cited by examiner

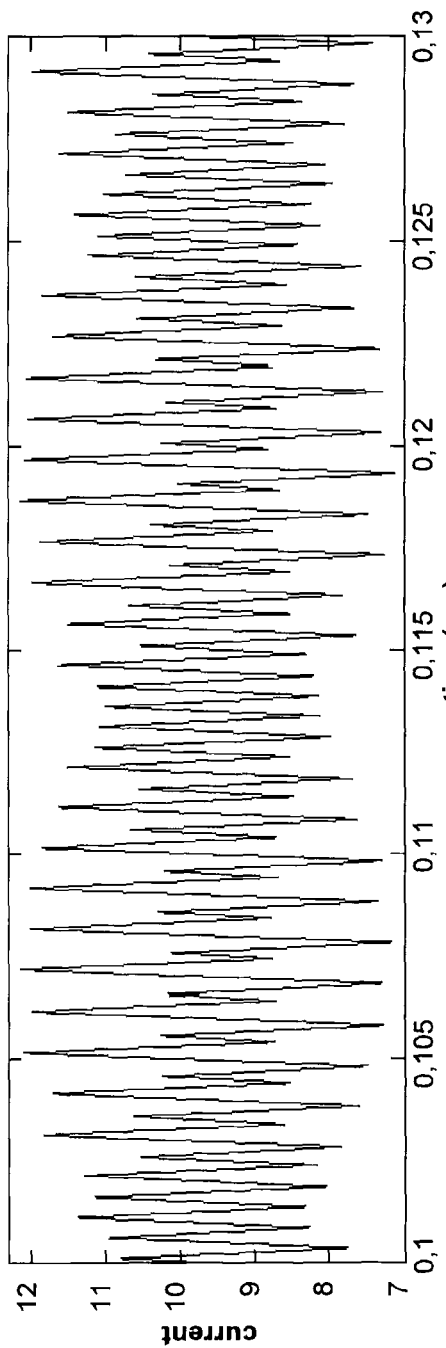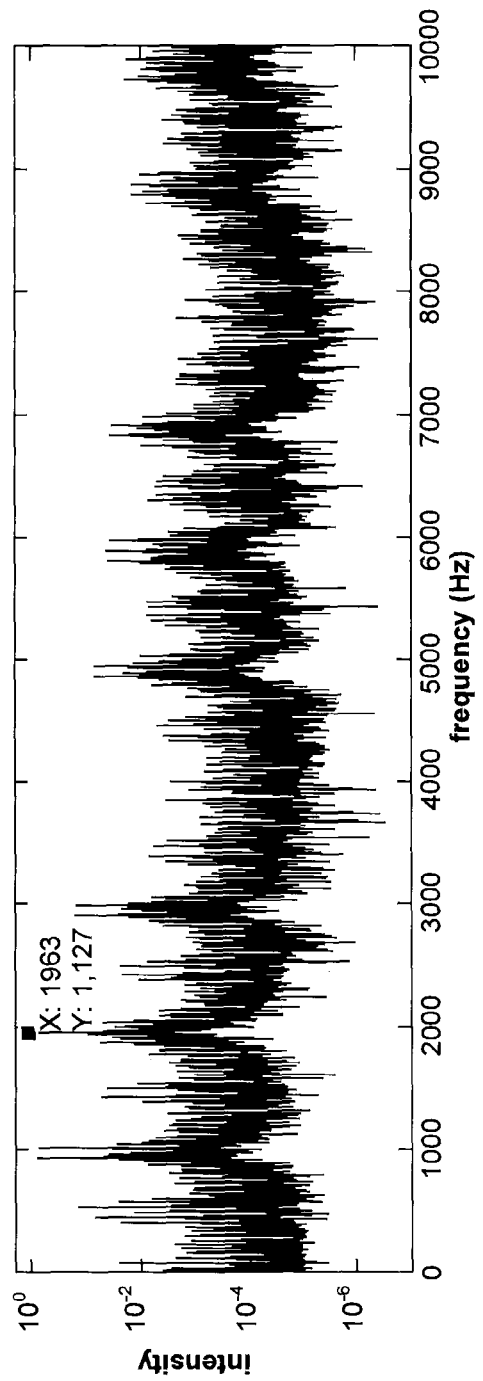

METHOD FOR REDUCING SPURIOUS EMISSIONS FROM A VOLTAGE CONVERTER WITH CLOCKED POWER SWITCHES

CROSS REFERENCE TO RELATED APPLICATIONS

This application claims priority to International Patent Application number PCT/EP2015/056448, filed on Mar. 25, 2015, which claims priority to German Patent Application number 10 2014 104 730.3, filed on Apr. 3, 2014, and is hereby incorporated by reference in its entirety.

FIELD

The present disclosure relates to a method for reducing spurious emissions of a current converter or voltage converter having at least one power switch which is actuated with an actuating signal.

SUMMARY

The disclosure is based on a method for reducing spurious emissions of a current converter or voltage converter having at least one power switch which is actuated with an actuating signal, which method does not require random variations to be generated and nevertheless is able to change the spurious emissions considerably. In particular, the method according to the disclosure is to be suitable for use on converters with a flying capacitor in order to reduce the spurious emissions which occur in asymmetrical operation of the respective power switches which are connected in series.

The disclosure is based on a method for reducing spurious emissions of a current converter or voltage converter having at least one power switch which is actuated with an actuating signal, wherein each actuating signal comprises switch-on pulses which are spaced apart from one another and has a fixed clock frequency. The pulse widths of the switch-on pulses are modulated in order to regulate a current or a voltage in or at the current converter or voltage converter according to a setpoint. In addition, the pulse widths are varied more quickly and more strongly than is appropriate for achieving the current or the voltage in or at the current or voltage converter according to the setpoint in order to change the spectrum of the spurious emissions. Changes to the pulse widths when they additionally vary compared to the pulse widths which would arise only owing to their modulation to achieve the current or the voltage according to the setpoint are made on the basis of successive groups of changes which each extend over a predefined number of successive switch-on pulses and in which a sum of the changes is zero in each case. According to the disclosure, the successive groups of changes are varied with respect to at least one aspect which is selected from absolute values of the changes, signs of the changes, a sequence of the changes and an extent of the group. This implies that in a method according to the disclosure not only a single group of changes which fits the pulse widths which would arise only owing to their modulation to achieve the current or the voltage according to the setpoint is repeated periodically. In addition, there is no need for random modulation of an output function of the respective actuating signal or of any other random variation.

If, in the present disclosure, the absolute values of the changes between the successive groups of changes are varied, this can mean, in particular, that although the changes in the pulse widths of two successive groups follow basically the same pattern, they are different.

If, in the present disclosure, the signs of the changes are varied, this means that the direction of the variation between successive groups of changes is changed. Therefore, all instances of shortening of the pulse widths in one group may be followed by instances of lengthening of the pulse widths at the corresponding positions of the successive group.

If the sequence of the changes in the group is varied, the changes in two successive groups can basically be the same but occur in a different sequence.

Groups with a different extent are groups in which different numbers of switch-on pulses follow one another until the sum of the changes is zero. It is to be noted here that the feature according to which the sum of the changes in each group is zero applies primarily to the totality of the switch-on pulses in the case of a plurality of power switches and correspondingly actuating signals comprising a plurality of switch-on pulses. Furthermore, the switch-on pulses for each of the power switches can also have changes which are added together to zero. However, this can be the case only after a plurality of successive following groups of the changes.

In some embodiments of the present disclosure, the changes in the pulse widths between two successive groups according to the at least one of the abovementioned aspects are varied, and, in addition, a further variation in respect of a further of the abovementioned aspects takes place over a plurality of groups. These two aspects can be, in particular, the two first aspects, i.e. the variation in the absolute values of the changes between, in each case, two successive groups and the signs of the changes over a plurality of groups. In this case, each group of the changes can extend over a same number of successive switch-on pulses, with the result that the extent of the groups remains the same. The sequence of the changes can also remain the same apart from the change of sign.

Specifically, the successive groups of changes can differ from one another exclusively in respect of a scaling factor. This means that the changes in the successive groups can be transferred one into the other in pairs by applying this scaling factor. A change of sign of the scaling factor also brings about a change of sign in the changes In one embodiment of the method according to the disclosure, the scaling factor by which the changes in the successive groups of the changes differ from one another is predefined by means of a variation control function which is variable over time. Of course, the variability of the variation control function over time is coordinated with the extent of the groups of changes in such a way that the scaling factor changes between the groups and this occurs over a relatively large number of groups. In other words, when the variation control function is periodic, its period length is an order of magnitude longer than the individual groups of the changes in the pulse width.

In particular, the variation control function can have a mean value of zero. This results in both positive and negative scaling factors. With negative scaling factors, the signs of the changes in the corresponding groups of changes are reversed compared to those with positive scaling factors. A possible variation function is, in particular, a sine function or triangle function. The frequency of the variation control function occurs additionally in the changed spectrum of the spurious emissions. However, said frequency usually has a large distance from those peaks in the spectrum of the spurious emissions which occur at relatively high frequencies.

The variation in the changes in the pulse widths between successive groups of changes extends over at least two successive groups, wherein in the case of precisely two groups the third group could again be the same as the first. In one embodiment the variation in the groups extends over a multiplicity of groups such as, for example, 5 to 50 groups. An extent over a hundred successive groups is also possible. However, with a very large number of groups over which the variation in the group is distributed, frequently no usable effect is achieved in respect of the changing of the spectrum of the spurious emissions because the variation in the changes of the pulse widths between two successive groups of changes then turns out to be only very small.

In the case of just one power switch which is actuated to meet the specification, the number of successive switch-on pulses of each group of changes lies in a typical range from two to ten. Relatively large extents of the individual groups are possible, but may have little additional effect on the changing of the spectrum of the spurious emissions.

If a plurality of power switches are actuated in coordination with one another in order to meet the respective specification, it is the case with respect to the extent of each individual group that the number of successive switch-on pulses of the group is equal to a number of the power switches or to an integral multiple thereof. In the case of two power switches this means that each group extends over two, four, six or a relatively large even number of switch-on pulses. Each of the control pulses involved therefore contributes one pulse or at any rate an equal number of switch-on pulses.

Specifically, in the case of a plurality of power switches which are actuated to achieve the current or the voltage according to the setpoint, the number of successive switch-on pulses of each group of changes is equal to 1 to 5 times the number of the power switches. As a result, comparatively compact groups of the changes result, over which there is in fact only a limited possibility of influencing the spectrum of the spurious emissions. However, the spectrum of the spurious emissions is changed additionally by the additional variation of the changes between the successive groups.

In one embodiment of the method according to the disclosure, the plurality of power switches which are actuated in order to achieve the current or the voltage according to the setpoint are power switches of partial converters which are connected in parallel and operated in an interleaving mode, of a converter. In this context, e.g. certain converters in one group of changes can contribute less to a current which is output than other converters, and within the scope of the variation of the changes between successive groups this ratio can be modified and can in this context also be reversed.

In another embodiment of the method according to the disclosure, two power switches which are actuated to achieve the current or the voltage according to the setpoint are power switches of a half bridge comprising a flying capacitor. A half bridge comprising a flying capacitor has a total of four power switches, of which two are connected in series between one of the inputs of the half bridge and its center point and the other two are connected in series between the other one of the inputs of the half bridge and its center point, wherein the center points of the two series circuits are connected to one another by means of the flying capacitor. Of these four power switches, the two power switches of one or the other series circuit are clocked with a relatively high frequency alternatingly on a half wave basis in order to operate the half bridge so as to shape an alternating current, wherein the method according to the disclosure is applied. If asymmetrical actuation of the two power switches which are clocked with a relatively high frequency is necessary in order to keep the voltage across the flying capacitor at a desired value, the variation in the pulse widths according to the disclosure has the effect that the spectrum of the spurious emissions not only has few peaks but is also spread out wider.

The same also applies if the two power switches which are actuated to achieve the current or the voltage according to the setpoint in the method according to the disclosure are the two power switches of a DC/DC converter with a flying capacitor, in particular of a boost converter and/or buck converter.

In the case of such a DC/DC converter with a flying capacitor, the respective changes within a group of changes can have the same absolute value and a changing sign. This then results overall in a method for reducing spurious emissions of two power switches of a DC/DC converter with a flying capacitor, wherein the power switches are each actuated with an actuating signal which comprises switch-on pulses which are spaced apart from one another. In one embodiment the pulse widths of the switch-on pulses are modulated in order to achieve a current or a voltage according to a setpoint, wherein the pulse widths are additionally varied more quickly or more strongly than would be appropriate for achieving the current or the voltage according to the setpoint in order to change the spectrum of the spurious emissions. Changes in the pulse widths during their additional variation compared to the pulse widths which would arise only owing to their modulation to achieve the current or the voltage according to the setpoint are made on the basis of successive groups of changes which extend over a predefined number of respective successive switch-on pulses and in which a sum of the changes is in each case zero. In one embodiment each group of changes extends over two to ten successive switch-on pulses of the actuating signal, wherein the respective changes within each group have the same absolute value and a changing sign, and wherein the absolute value of the changes in successive groups of the changes differs in respect of a scaling factor which is predefined by a variation control function which is variable over time and which has a mean value of zero.

A pulse position of the switch-on pulses within a clock period of the respective actuation signal may be fixed, with the result that it is possible to operate with a simple customary triangular output signal. However, the pulse position of the switch-on pulses can basically be varied, but it then also remains fixed when averaged over time.

Advantageous developments of the disclosure can be found in the patent claims, the description and the drawings. The advantages of features and of combinations of a plurality of features which are specified in the description are merely by way of example and can come into effect alternatively or cumulatively without the advantages necessarily having to be achieved by embodiments according to the disclosure. The following applies to the disclosure content of the original application documents and of the patent without the subject matter of the appended patent claims being changed by this: further features can be found in the drawings—in particular the illustrated geometries and the relative dimensions of a plurality of components with respect to one another and their relative arrangement and effective connection. The combination of features of different embodiments of the disclosure or of features of different patent claims is also possibly different from the selected back-references of the patent claims and is suggested hereby. This also applies to features which are illustrated in separate drawings or mentioned in the description of said drawings. These features can also be combined with features of different patent claims. Likewise, features which are disclosed in the patent claims may not occur in other embodiments of the disclosure.

The features which are mentioned in the patent claims and the description are to be understood in respect of their number in such a way that precisely this number or a larger number than the specified number is present without an explicit use of the adverb "at least" being necessary. Therefore, for example, if an element is mentioned, that is to be understood as meaning that precisely one element, two elements or more elements are present. These elements can be supplemented with further features or can be the only elements to which the respective method refers.

The reference symbols contained in the patent claims do not constitute a restriction of the scope of the subject matters protected by the patent claims. They serve merely the purpose of making the patent claims easier to understand.

BRIEF DESCRIPTION OF THE FIGURES

The disclosure will be explained and described further in the text which follows on the basis of preferred exemplary embodiments illustrated in the figures.

FIG. 4 shows the time profile of the current flowing through the reactor of the boost converter according to FIG. 1 if its two power switches are clocked asymmetrically, i.e. with pulse widths with different lengths, wherein the changes of the pulse widths are modulated chronologically compared to symmetrical actuation of the two power switches.

FIG. 5 shows a spectrum of spurious emissions of the boost converter according to FIG. 1 in the case of the same actuation of its power switches as gives rise to the current according to FIG. 4.

DESCRIPTION OF THE DISCLOSURE

The present disclosure relates to a method for reducing spurious emissions of a current converter or voltage converter having at least one power switch which is actuated with an actuating signal, wherein each actuating signal comprises switch-on pulses spaced apart from one another, wherein pulse widths of the switch-on pulses are modulated in order to regulate a current or a voltage in or at the current converter or voltage converter according to a setpoint, and wherein the pulse widths are additionally varied more quickly and more strongly than is appropriate for achieving the current or the voltage in or at the current or voltage converter according to the setpoint in order to change the spectrum of the spurious emissions. In other words, a pulse width modulation for achieving the current or the voltage according to the setpoint has superimposed on it an additional pulse width variation which as such does not serve the purpose of achieving the current or the voltage according to the setpoint because it takes place e.g. too quickly with respect to the time constants of a control loop for the pulse width modulation and/or is much too strong with respect to meeting the specification because such large changes in the pulse width are not appropriate for achieving the current or the voltage according to the setpoint. The superimposed pulse width variation changes the spectrum of the spurious emissions of the current converter or voltage converter by adding additional frequency components to a fundamental clock frequency of the actuating signal, which dominates the spectrum, i.e. shifting energy away from the clock frequency component to other frequency components, hence reducing the amplitude of the clock frequency component.

In particular, the disclosure relates to a method in which changes to the pulse widths during their additional variation compared to the pulse widths which would arise only owing to their modulation to achieve the current or the voltage according to the setpoint are made on the basis of successive groups of changes which each extend over a predefined number of successive switch-on pulses and in which a sum of the changes is zero in each case.

In the case of a plurality of power switches which are actuated with a plurality of actuating signals, the successive switch-on pulses under consideration here are the totality of the switch-on pulses for all the actuated power switches. These switch-on pulses which are assigned to the various power switches can overlap, in contrast to those of a single actuating signal for a single power switch.

Figure 1:
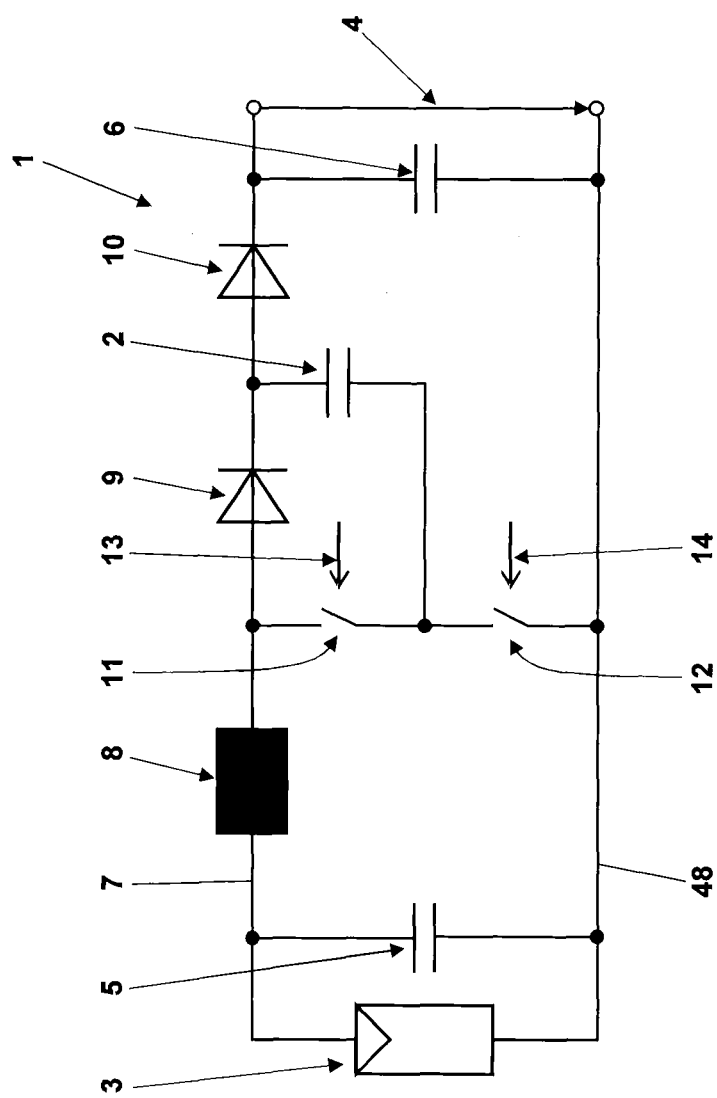
FIG. 1 shows, as an example of a circuit with two power switches in which the method according to the disclosure can be applied, a boost converter which is connected to a photovoltaic generator and comprises a flying capacitor.

FIG. 1 shows a boost converter 1 with a flying capacitor 2 which is connected to a photovoltaic generator 3 as a direct voltage source and which makes available a DC output voltage 4. The boost converter 1 has an input-side intermediate circuit capacitor 5 and an output-side intermediate circuit capacitor 6. A reactor 8 with a boost converter diode 9 and a further boost converter diode 10 are connected in series between said intermediate circuit capacitors 5 and 6 in a line 7. A series circuit composed of two power switches in the form of a boost converter switch 11 and a further boost converter switch 12 branches off, between the reactor 8 and the boost converter diode 9, to another line 48 which connects the intermediate circuit capacitors 5 and 6. The center point of the two boost converter diodes 9 and 10 is connected to the center point of the two boost converter switches 11 and 12 via the flying capacitor 2. During the operation of the boost converter 1, the two boost converters switches 11 and 12 are actuated in anti-phase, i.e. clocked with a phase offset of 180°, by actuating signals 13 and 14. In this context, the actuation is carried out in a regulated manner such that a desired DC output voltage 4 is obtained as generated from the DC input voltage which is made available at that time by the photovoltaic generator 3, and that the DC voltage which drops across the flying capacitor 2 is half as large as the DC output voltage 4. In order to keep the boost converter 1 in this balanced state, i.e. in the state in which half the DC output voltage 4 drops across the flying capacitor 2, the boost converter switches 11 and 12 are actuated symmetrically, i.e. with the same pulse widths.

Figure 2:
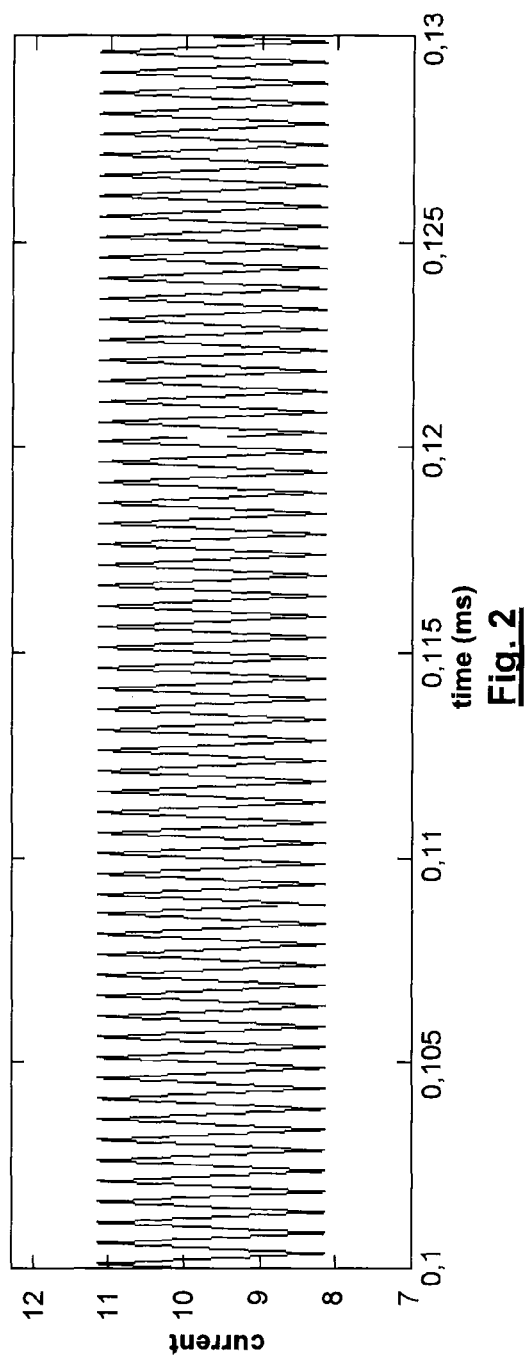
FIG. 2 shows the time profile of a current flowing through a reactor of the boost converter according to FIG. 1 if its two power switches are clocked symmetrically, i.e. with the same pulse widths.

The time profile of the resulting current which flows through the reactor 8 of the boost converter 1 is shown in FIG. 2. In this context, each rising edge of the current corresponds to a time period in which one of the two boost converter switches 11 and 12 according to FIG. 1 is conductive, wherein on the condition of non-overlapping actuating signals 13 and 14 each peak of the current corresponds to the point in time at which one of the two boost converter switches 11 and 12 changes into the non-conductive state. Since both boost converter switches 11 and 12 are closed for the same duration, all the peaks are of equal magnitude.

Figure 3:
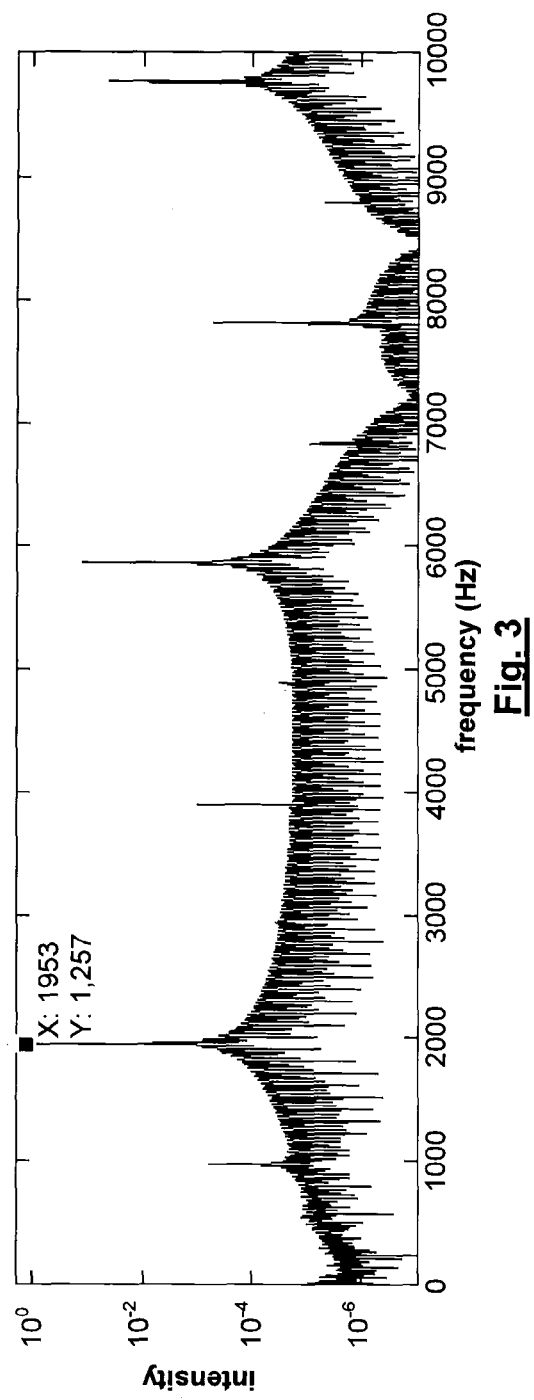
FIG. 3 shows a spectrum of spurious emissions which originate from the boost converter according to FIG. 1 if its two switches are clocked symmetrically as in FIG. 2.

The resulting spectrum of the spurious emissions which originate from the boost converter 1 is shown in FIG. 3. This spectrum comprises pronounced peaks of the intensity of the spurious emissions at twice the clock frequency of 1,000 Hz, here that is to say at 2,000 Hz, referred to the individual boost converter switches 11 and 12, and at relatively high harmonics of the double clock frequency, here, at 6,000 and 10,000 Hz. In contrast, the peak in the case of the clock frequency of 1,000 Hz with which the boost converter switches 11 and 12 according to FIG. 2 are actuated are less pronounced. The double clock frequency of the highest peak according to FIG. 3 corresponds to the frequency of the ripple of the current which is plotted in FIG. 2.

If the two high voltage boost converter switches 11 and 12 are actuated with the actuating signals 13 and 14 whose switch-on pulses have unequal pulse widths, this changes the spectrum of the spurious emissions. Specifically, additional spectral components occur which depend on a change $\Delta d$, which indicates how much the pulse widths are changed when the two high voltage boost converter switches 11 and 12 are actuated compared to an average pulse width of the switch-on pulses. In this context, by means of identical absolute values and reversed signs of these changes $\Delta d$ for both boost converter switches 11 and 12 it is possible to ensure that the current which is output by the boost converter 1 during each clock period of the actuating signals 13 and 14 remains unchanged. Constant absolute values and permanently reversed signs of the changes $\Delta d$ lead, however, to a situation in which the voltage across the flying capacitor 2 changes and the boost converter 1 leaves its desired balanced state. However, if the changes $\Delta d$ of the pulse widths for the actuation of the boost converter switches 11 and 12 are modulated over time with a variation control function whose mean value is zero, the balanced state of the boost converter switch 1 can be maintained over averaged time. In addition, as a result of the variation of the changes $\Delta d$ over time the change in the spectrum of the spurious emissions, in particular a reduction in the amplitudes of the peaks at the multiples of the clock frequency is achieved not only by means of new spectral components at fixed frequencies but also in extended frequency ranges.

FIG. 4 shows the time profile of the current which flows through the reactor 8 of the boost converter 1 according to FIG. 1 if a change $\Delta d$ which shortens the pulse widths of the respective one boost converter switch 11 and 12 according to FIG. 1 and lengthens the pulse widths of the respective other boost converter switch 12 or 11, respectively, according to FIG. 1, is varied with a sine function as a variation control function. Accordingly, the switch-on times of the one boost converter switch 11, 12 are temporarily longer and those of the other boost converter switch 12 or 11, respectively, are shorter, and vice versa, wherein corresponding current peaks are formed. In other words, the different peak heights represented in FIG. 4 of directly successive peaks of the current reflect the different pulse widths of the switch-on pulses of the actuations 13 and 14. It is to be noted here that in each case one of two directly successive peaks is increased compared to the peaks according to FIG. 2 because the corresponding pulse width is increased by $\Delta d$, while the following peak is lowered because the corresponding pulse width is reduced by $\Delta d$. In this context, the sign of these changes of the pulse widths reverses between the actuating signals 13 and 14 with the half waves of the variation control function. This concept is very easy to implement by superimposing the variation control signal additively on the specifications for the pulse widths of the switch-on pulses of the actuating signals 13 and 14, wherein the variation control signal is added with a positive sign for the one actuating signal 13 or 14, and with a negative sign for the one actuating signal 14 or 13, respectively.

Despite the basically identical frequencies of the ripple of the current according to FIG. 4 and of the ripple of the current according to FIG. 2, the resulting spectrum of the spurious emissions, as shown in FIG. 5, is fundamentally changed as compared to FIG. 3. The intensities of the spurious emissions are distributed more uniformly over the spectrum according to FIG. 5. The absolute height of the peak at twice the switching frequency is reduced. None of the peaks at the relatively high harmonics of twice the switching frequency reaches the level as in FIG. 3. Instead, the spectral range becomes more clearly salient around the switching frequency at 1,000 Hz and three times the switching frequency at 3,000 Hz. As a result of these changes in the spectrum of the spurious emissions it is possible to ensure e.g. that disruptive interference with other switching circuits is eliminated.

From the illustration of the profile of the current according to FIG. 4 it becomes clear that the variation control function modulates the pulse widths for actuating the boost converter switches 11 and 12 and therefore their switch-on times more strongly and also more quickly than would be necessary for reasonable pulse width modulation for setting the desired output voltage 4 of the boost converter 1 according to FIG. 1 and for achieving or retaining its balanced state. Exactly for this reason, the variation in the pulse widths which is carried out in order to change the spectrum of the spurious emissions is not perceived as a disruption of the function of the boost converter 1. In addition, the sum of the changes $\Delta d$ is already zero after two successive switch-on pulses because the one boost converter switch 11 or 12 is in each case switched on for longer compared to the average pulse width for certain duration time which is the same duration as that by which the other boost converter switch 12 or 11, respectively, is switched on for a shorter time. The period length of the variation control frequency corresponds here to 12 times the clock frequency at which each of the boost converter switches 11 and 12 is actuated with the actuating signals 13 and 14.

Figure 6:
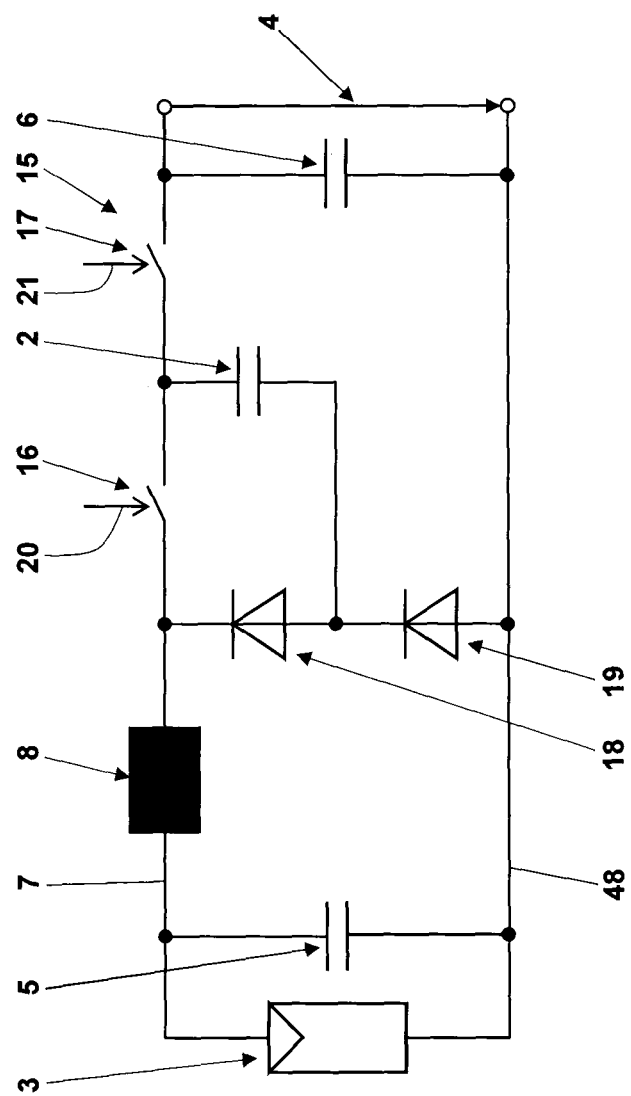
FIG. 6 shows a buck converter with a flying capacitor as a further embodiment of a circuit with two power switches in which the method according to the disclosure can be applied.

FIG. 6 shows a buck converter 15 with a flying capacitor 2. Here, in contrast with a customary buck converter circuit two buck converter switches 16 and 17 which are connected in series to one another and two buck converter diodes 18 and 19 which are connected in series to one another are provided, wherein the center point of the buck converter switches 16 and 17 is connected to the center point of the buck converter diodes 18 and 19 via the flying capacitor 2. In other words, the switches are interchanged with the diodes compared to the circuit of the boost converter 1 according to FIG. 1. For the actuation of the buck converter switches 16 and 17 two goals have to be achieved, i.e. to set a desired output voltage 4 and to adjust the voltage dropping across the flying capacitor 2 to half this output voltage 4 and hold it there. In order to change the spectrum of the spurious emissions which originate from the buck converter 15 in this context, so as to distribute e.g. the spectral intensity over a larger frequency range, the pulse widths of actuating signals 20 and 21 with which the buck converter switches 16 and 17 are actuated are varied in the same way as was explained above with respect to FIG. 4 for the boost converter 1 according to FIG. 1.

Figure 7:
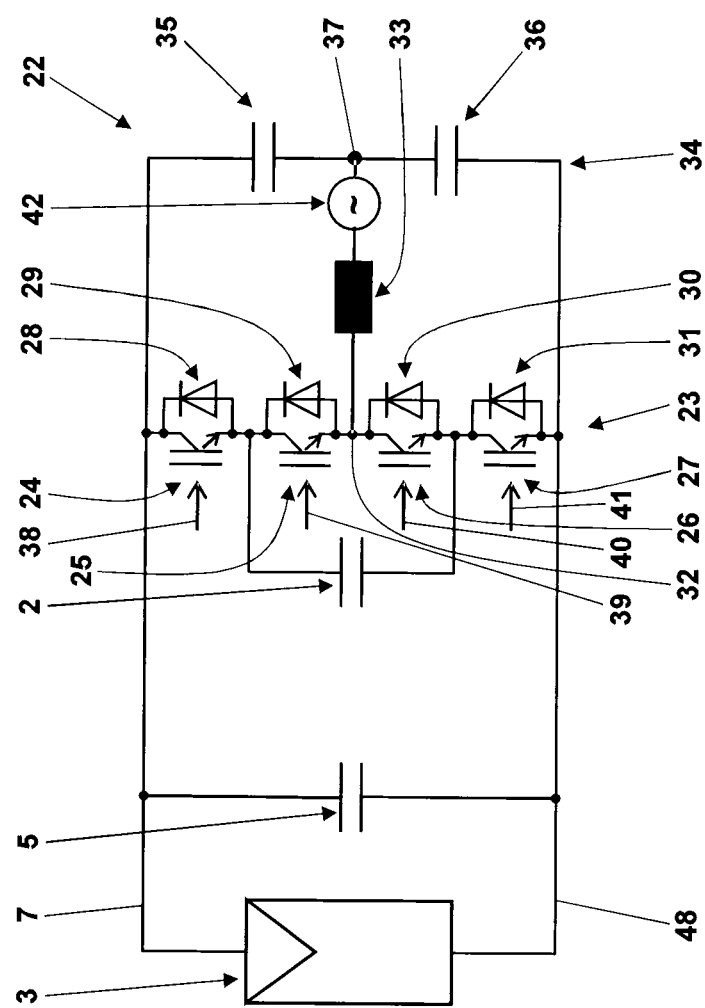
FIG. 7 shows a DC/AC converter with a half bridge with a flying capacitor as a further embodiment of a circuit with power switches, in which the method according to the disclosure can be applied.

FIG. 7 shows a DC/AC converter 22 with a flying capacitor 2. The DC/AC converter 22 transforms a DC input voltage made available by, e.g. a photovoltaic generator 3 into an AC output voltage 42. In this context, a DC/DC converter (not shown) can be connected between the photovoltaic generator 3 and an input-side intermediate circuit capacitor 5 in order to keep the voltage dropping across the intermediate circuit capacitor 5 constant even in the case of a varying DC input voltage of the photovoltaic generator 3. This DC/DC converter which is frequently present in a photovoltaic inverter is, however, not illustrated here. The DC/AC converter 22 has a half bridge 23 composed of semiconductor power switches 24 to 27 with free-wheeling diodes 28 to 31. In this context, two pairs of semiconductor power switches are connected in respective series circuits between a center point 32 of the half bridge 23 and one of the lines 7 and 48 between which the DC input voltage is present, respectively. The center points of these series circuits are connected to one another via the flying capacitor 2. A reactor 33, via which the AC output voltage 42 is output is connected to the center point 32 of the half bridge 23. A second half bridge 34 of the DC/AC converter 22 is constructed from capacitors 35 and 36 whose center point 37 is the other output point of the AC output voltage 42. In order to shape an alternating current which is output via the reactor 33, the two semiconductor power switches 24 and 25 or 26 and 27 are clocked with a relatively high frequency on a half wave basis on the two sides of the center point 32. In this context, a pulse width modulation is carried out in order to meet the desired specifications of the current shaping and the setting of the voltage which drops across the flying capacitor 2 and is to be half as high here as the voltage dropping across the half bridge 34 composed of the capacitors 35 and 36. The pulse widths, resulting from this pulse width modulation, of the switch-on pulses of actuating signals 38 and 39 or 40 and 41, respectively, for the semiconductor power switches 24 and 25 or 26 and 27, respectively, are varied during each period of the clock signals according to FIG. 4, wherein the changes in the pulse widths during each period of the clock signals in total amount to zero, and wherein these changes are varied using a scaling factor, which follows a variation control function which is variable over time with a mean value of zero, as in FIG. 4. This also results in the desired change in the spectrum of the spurious emissions of the DC/AC converter 22 without adversely affecting the basic function of the DC/AC converter 22, and therefore without leaving its balanced state.

Figure 8:
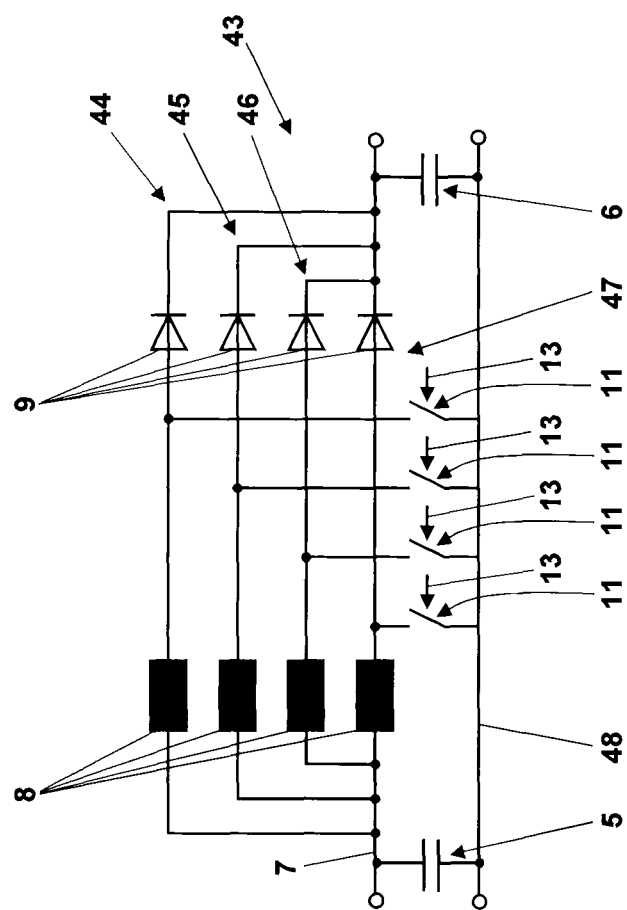
FIG. 8 shows a boost converter with four partial converters which are connected in parallel as a further embodiment of a circuit with power switches in which the method according to the disclosure can be applied.

FIG. 8 shows a boost converter 43 with four partial converters 44 to 47. All four partial converters 44 to 47 are connected in parallel with one another between an input-side intermediate circuit capacitor 5 and an output-side intermediate circuit capacitor 6. In a customary arrangement they each comprise a reactor 8, a boost converter diode 9 which is connected in series therewith in the line 7 and a boost converter switch 11 which leads to the other line 48 between them. The individual partial converters 44 to 47 of the boost converter 43 are operated in a so-called interleaving mode, in order to minimize a total current drawn from the intermediate circuit capacitor 5 by the boost converter 43. In order to change the spectrum of the spurious emission originating from the boost converter 43, the pulse widths of the switch-on pulses of the actuating signals 13 are varied with respect to one another. These variations take place in such a way that the sum of the variations, i.e. the instances of lengthening and the instances of shortening of the individual pulse widths is zero over one group of switch-on pulses. A further group of switch-on pulses, over which the sum of the changes is also zero, is added to this group of switch-on pulses. In addition, this following group of switch-on pulses varies with respect to its changes in the pulse widths compared to the previous group. In this context, this additional variation relates to the absolute value of the individual changes in the pulse widths and/or the sign of the changes of the individual pulse widths and/or the sequence of the changes in the individual pulse widths within the group and/or the extent of the group, i.e. the number of the switch-on pulses until the sum of the changes reaches zero. In one embodiment the successive groups of changes also differ here only in respect of the scaling factor which is predefined by a variation control function with a mean value of zero.

Although not shown in the figures, the method according to the invention is readily applicable to converters comprising just one power switch, e.g. a conventional boost converter arranged like one of the partial converters 44 to 47. The resulting effect on the spectrum of the spurious emission when applying the method according to the disclosure to such conventional converter is basically the same as described with respect to FIGS. 2 to 5.

The invention claimed is:

1. A method for reducing spurious emissions of a current or voltage converter having at least one power switch which is actuated with an actuating signal, wherein the actuating signal comprises switch-on pulses spaced apart from one another and has a fixed clock frequency,
    modulating pulse widths of the switch-on pulses in order to regulate a current or a voltage in the current or voltage converter according to a setpoint,
    wherein the pulse widths are varied for achieving the regulation of the current or the voltage in the current or voltage converter according to the setpoint, and
    wherein the pulse widths are additionally varied in order to change a spectrum of spurious emissions, wherein the additionally varying comprises successive groups of changes to the pulse widths which are applied to successive groups of switch-on pulses extending over a predefined number of successive switch-on pulses, and wherein sums of the changes comprised in each of successive group of changes are zero and absolute values of the changes comprised in the successive groups of changes differ by a scaling factor.

2. The method as claimed in claim 1, wherein the scaling factor is predefined by a variation control function which is variable over time.

3. The method as claimed in claim 2, wherein the variation control function has a mean value of zero and comprises a sine function or triangle function.

4. The method as claimed in claim 1, wherein a variation in the groups of changes extends over at least 2 and at maximum 50 successive groups.

5. The method as claimed in claim 1, wherein when there is exactly one power switch that is actuated in order to regulate the current or the voltage, the number of successive switch-on pulses of each group of the changes is in a range from 2 to 10.

6. The method as claimed in claim 1, wherein the number of the successive switch-on pulses of each group of changes is equal to a total number of power switches of the at least one power switch which are actuated in coordination with one another in order to regulate the current or the voltage, or the number of the successive switch-on pulses of each group of changes is equal to an integral multiple thereof.

7. The method as claimed in claim 6, wherein the number of successive switch-on pulses of each group of changes is equal to 1 to 5 times the total number of the power switches which are actuated in coordination with one another in order to regulate the current or the voltage.

8. The method as claimed in claim 6, wherein the power switches which are actuated in order to regulate the current or the voltage are power switches of partial converters of the current or voltage converter connected in parallel and operated in an interleaving mode.

9. The method as claimed in claim 6, wherein two power switches which are actuated in order to regulate the current or the voltage have a half bridge configuration with a flying capacitor.

10. The method as claimed in claim 9, wherein the current or voltage converter is a boost DC/DC converter or a buck DC/DC converter.

11. The method as claimed in claim 10, wherein the changes to the pulse widths within each group of changes have a same absolute value and a changing algebraic sign, each group comprising at least one switch-on pulse for each of the two power switches of the boost converter with a flying capacitor.

12. The method as claimed in claim 1, wherein a pulse position of the switch-on pulses is fixed at least when averaged over time within a clock period of the actuating signal.

* * * * *